United States Patent

[11] 3,601,370

[72] Inventors Erwin Ruettener
Riehen;
Fritz Sutter, Pratteln, both of, Switzerland
[21] Appl. No. 776,418
[22] Filed Nov. 18, 1968
[45] Patented Aug. 24, 1971
[73] Assignee Buss AG.
Basel, Switzerland
[32] Priority Nov. 20, 1967
[33] Switzerland
[31] 16,330/67

[54] CONTINUOUSLY OPERATING MIXING AND KNEADING MACHINE
2 Claims, 4 Drawing Figs.

[52] U.S. Cl. .................................................. 259/5,
259/9
[51] Int. Cl. ...................................................... B01f 7/02,
B01f 13/04
[50] Field of Search ........................................... 259/4–10,
21, 40, 109, 110

[56] References Cited
UNITED STATES PATENTS

| | | | |
|---|---|---|---|
| 2,731,247 | 1/1956 | Hudry | 259/6 |
| 3,031,030 | 4/1962 | Rodenacker | 259/9 UX |
| 3,219,320 | 11/1965 | Sutter | 259/5 |
| 3,224,739 | 12/1965 | Schuur | 259/4 |
| 3,346,242 | 10/1967 | List | 259/5 X |
| 3,347,528 | 10/1967 | List et al. | 259/10 X |
| 3,367,635 | 2/1968 | Gresch | 259/4 |

*Primary Examiner*—James Kee Chi
*Attorney*—Abraham A. Saffitz

ABSTRACT: Continuously operating mixing and kneading machine embodying a continuous, rotating, reciprocating worm shaft mounted in a housing, which machine is divided into a feeder zone with continuous worm channels; an initial pressure buildup zone with discontinuous worm channels and with kneading dogs additionally mounted in the housing; a detensioning zone and a reintroduction zone, both with continuous worm channels; and a second pressure buildup zone with discontinuous worm channels and with kneading dogs mounted additionally in the housing.

PATENTED AUG 24 1971

INVENTORS:
Erwin RUETTENER
and Fritz SUTTER
By Abraham A. Saffitz
ATTORNEY

INVENTORS:
Erwin RUETTENER
and Fritz SUTTER

PATENTED AUG24 1971
3,601,370
SHEET 3 OF 3

INVENTORS:
Erwin RUETTENER
and Fritz SUTTER

By *Abraham A. Saffitz*
ATTORNEY

CONTINUOUSLY OPERATING MIXING AND KNEADING MACHINE

Mixing and kneading machines produce a homogeneous plasticized mixture from a material introduced into them in the form of powder, chips or granules together with colorants and other auxiliary substances. Irrespective of whether the product is to be processed into granules, calendered or otherwise further treated following this process, it is essential that any components present in solution in the product in the form of vapor or gas should be released from it and extracted, if the end-product is to meet high standards of quality, as is the case for instance with plastics for gramophone record manufacture or for electrical insulators.

In what manner such products for release, hereinafter referred to as "gases," penetrated into the product is not of significance to the present problem. Difficulties in extracting the gases from the product arise from the viscosity and elasticity of the latter. These properties obstruct the passage of the gases to the surface, the only situation in which the bubbles of gas can burst and release the gas.

One possible method of effecting this would be to increase the temperature so as to reduce the viscosity of the product, thus facilitating the passage of the gas bubbles to the surface.

This is often impossible, however, as certain products would not tolerate an adequately large rise in temperature.

A second method of liberating the gas consists in subjecting the product to an abrupt drop in pressure, using a choke ring. As the product emerges in a thin layer between the choke ring and the shaft, it does indeed display an extended surface area with consequent facilitation of degassing, but if by reason of its elasticity or internal viscosity this thin layer immediately contracts again to form rolls with a reduced surface area, it is difficult to extract the gas.

A further difficulty then arises in bringing these rolls back into the spiral channels of the worm before they have remained so long in the degassing zone that they choke the latter or cause damage to the product, for example by reason of a protracted temperature effect.

The mixing and kneading machine now suggested not only eliminates these disadvantages but additionally permits more effective degassing than is possible by decompression of the product alone.

The proposed mixing and kneading machine, which embodies a continuous, rotating, reciprocating worm shaft mounted in a housing, is characterized by the fact that it is divided into a feeder zone with continuous worm channels; an initial pressure buildup zone with discontinuous worm channels and with kneading dogs additionally mounted in the housing; a detensioning and a reintroduction zone, both with continuous worm channels; and a second pressure buildup zone with discontinuous worm channels and with kneading dogs additionally mounted in the housing.

One example of the execution of the subject of the invention is illustrated in the accompanying drawings, in which.

Figure 1:
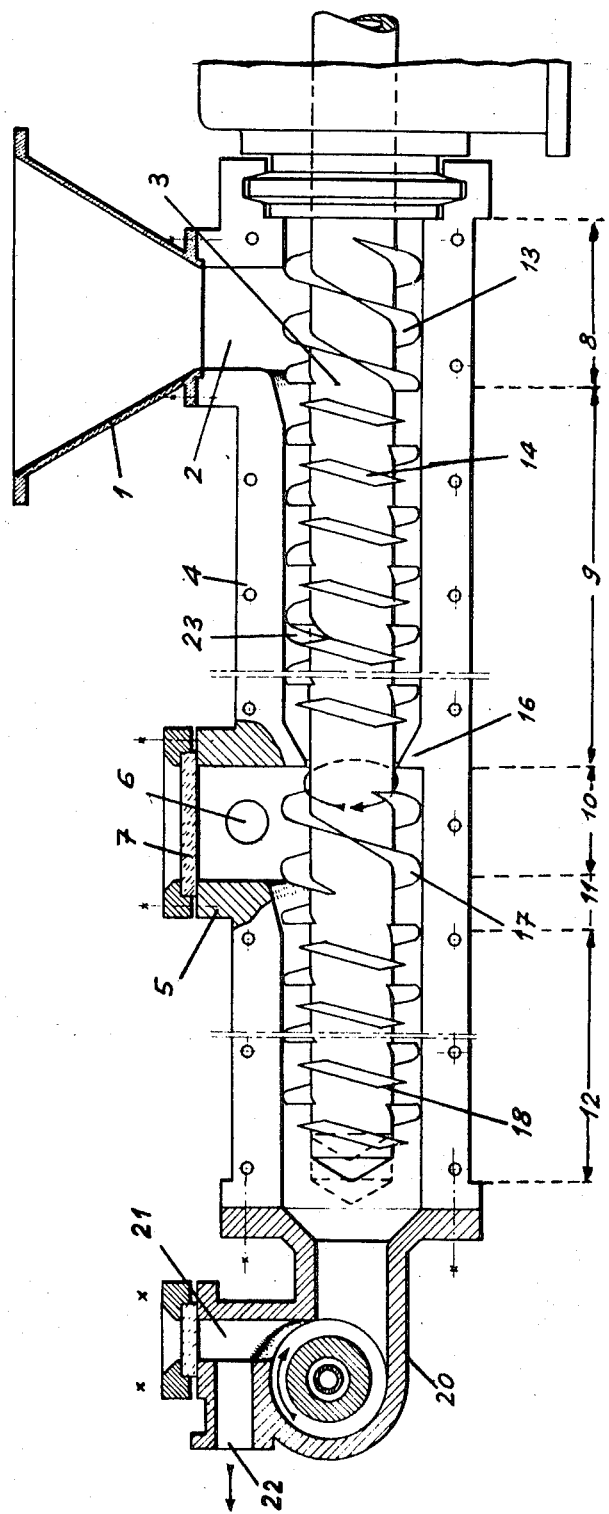
FIG. 1 shows a vertical longitudinal section of the mixing and kneading machine
Figure 2:
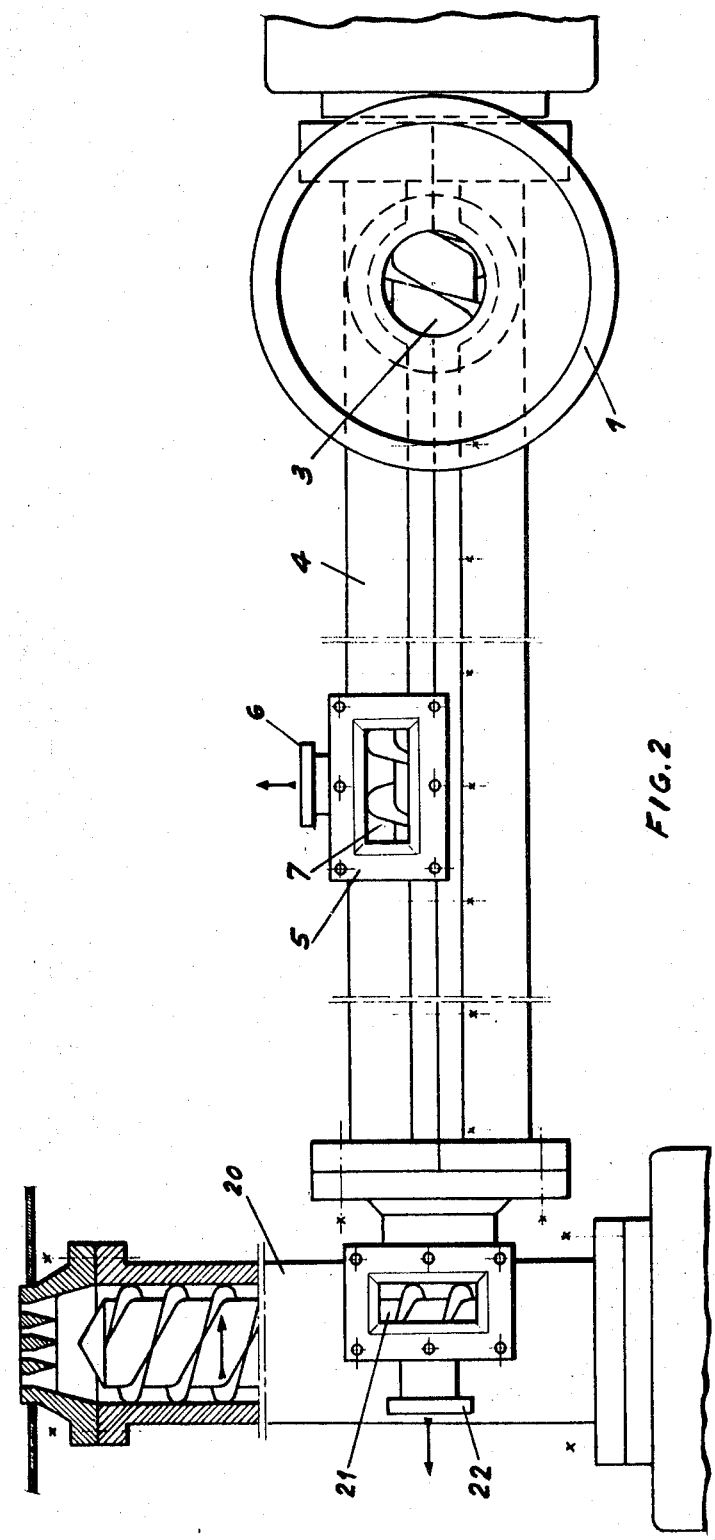
FIG. 2 shows a top view, partially in section, of the mixing and kneading machine

A worm shaft 3 is borne in a housing 4 and is driven by a power unit not shown in detail, in such manner that it rotates and at the same time executes a reciprocating axial movement and in the manner as shown in U.S. Pat. No. 3,367,635 to W. Gresch, dated Feb. 6, 1968.

The housing 4 is provided with a feeder opening 2 and a feeder device 1 and additionally embodies a degassing well 5. In this degassing well is provided a vacuum feed pipe 6, the top closure of the degassing well being formed by an inspection glass 7 with an airtight fit.

Figure 3:
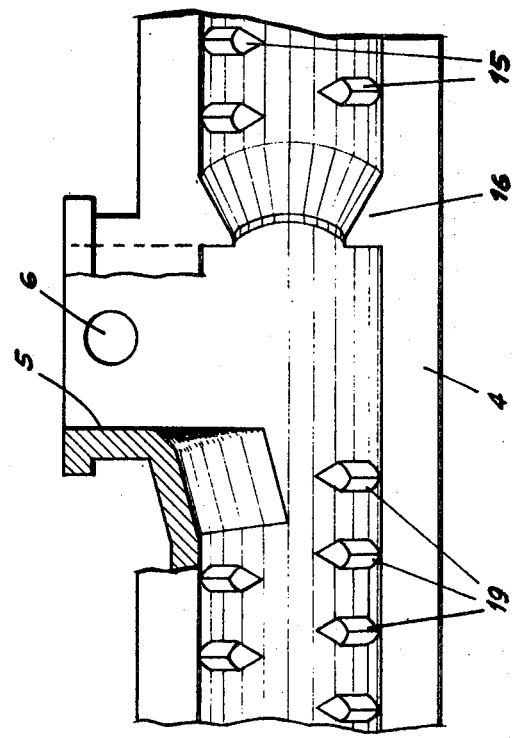
FIG. 3 shows a view, partially in section, of the detensioning and reintroduction zone less shaft
Figure 3A:
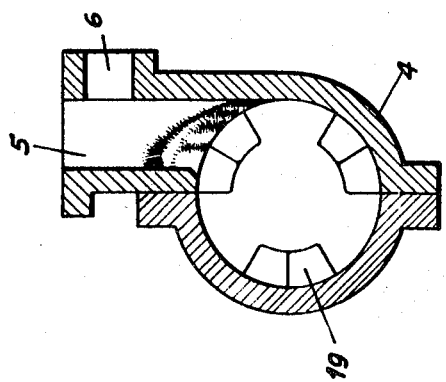
FIG. 3a shows a cross section along the line A—A in FIG. 3.

The worm shaft 3 which extends throughout the entire housing 4 is provided with continuous worm channels 13 over the length of the feeder zone 8. Over the length of the first pressure buildup zone 9, the worm channels 14 on the shaft 3 are discontinuous, but additional kneading dogs 15 are mounted in the housing (FIG. 3). The end of the first pressure buildup zone 9 is formed by a choke ring 16 mounted in the housing 4 and effecting a conical contraction of the housing diameter.

Over the length of the detensioning zone 10 and the reintroduction zone 11, the shaft 3 is again provided with continuous worm channels 17, while in the second pressure buildup zone 12 it is again provided with continuous worm channels 18. In this second pressure buildup zone 12, too, the interior wall of the housing carries kneading dogs 19.

At the exit from the second pressure buildup zone 12 is a flange-mounted discharge worm 20 in which if appropriate an additional degassing process within a degassing well 21 and a vacuum feed pipe 22 can take place.

Within the reintroduction zone 11 a cutaway portion of the interior wall of the housing takes the shape of a segment of a circular cylinder inner lining, the axis of the said circular cylinder being angled in relation to the worm shaft 3 in the direction of the degassing well 5. The segment edge thus formed is rounded off to the interior wall of the degassing well 5 with a radius tapering off in the direction of rotation of the shaft 3 to zero.

The product for processing, in the form of powder, chips or granules or a mixture thereof, enters the feeder zone 8 of the mixing and kneading machine by way of the infeed device 1 and the infeed opening 2.

The continuous worm channels 13 of the shaft 3 in the sector of this infeed zone 8 feed the product continuously and without intermediate halt into the first pressure buildup zone 9, where it is mixed and kneaded intensively and brought to high pressure. In this process the specific volume of the product is reduced. Account may be taken of this by filling out the interstices in the discontinuous worm channels 14 with channel occlusion elements 23. Thereafter the product proceeds into the area of the choke ring 16 and flows in a thin layer between the latter and the well 3 through into the detensioning zone 10. As a result of this the pressure sinks abruptly, thus releasing the components in gaseous form dissolved in the product, allowing them to rise up the degassing shaft and be drawn off into the vacuum feed pipe 6. However, the viscosity of the product permits only a portion of the gas to escape from it.

The continuous worm channels 17 along the detensioning zone 10 feed the product onward without a halt through the reintroduction zone 11 and into the second pressure buildup zone 12.

This zone 12 is similarly arranged to the initial pressure buildup zone 9, and here again the shaft is provided with continuous worm channels 18 and the interior wall of the housing with kneading dogs 19.

Close to the intake zone 11, the zone 12 is not completely filled out with the product. In this zone the product is repeatedly torn apart and pressed together again. This results in a very large product surface area which permits a correspondingly powerful additional extraction of gas. The gas as it emerges is able to stream back through the gaps between the product and the worm channels 18 into the degassing shaft 5, against the direction of feed. The compound movement of the shaft 3 made up of a rotating movement and an axial reciprocating movement considerably facilitates this retrograde gas stream and the layout of the intake zone 11 described ensures that the entire flow of product is transferred and no congestion arises in the degassing shaft 5. It is possible to supervise the proper functioning of the reintroduction zone through the inspection glass.

As the product is fed onward through the second pressure buildup zone 12, the gaps in the product close up, it is again compressed and leaves the machine in a gently pulsating stream. In the flange-mounted discharge worm 20 directly following, which moves only in rotation, the pressure is completely equalized. At the transition point to the discharge worm 20, where the product is again torn apart and recompressed, it is possible to carry out further degassing by means of the degassing pipe 21 and the vacuum feed pipe 22.

Using the device proposed and a viscous thermoplastic not behaving in accordance with Newton's principles of internal friction when in a plastic rhelogical condition, it has been found possible to operate the expulsion of volatile components with infinite variability within a range of 200–1,000 kg. per hour without any disadvantages appearing. The material in the form of a powder with a low bulk weight was placed in the feeder hopper of a single-spindle continuous mixing and kneading machine with a reciprocating shaft and was brought to a condition of molten viscous plasticity by the application of heat and kneading, compressed under ascending pressure, detensioned and purged of volatile components, reintroduced into the worm by means of the proposed device and the pressure simultaneously built up again.

What we claim is:

1. A continuously operating mixing and kneading machine comprising:
  1. a rotating and reciprocating worm shaft,
  2. a housing surrounding said shaft provided with a feeder opening, a degassing well adapted for attachment to vacuum means,
  3. a feeder zone below said feeder opening in said housing provided with continuous worm channels,
  4. an initial pressure buildup zone formed by discontinuous worm channels on said shaft and kneading dogs attached and mounted to the inner wall of said housing to build up the mixing pressure from said feeder zone,
  5. a detensioning zone formed by continuous worm channels on said shaft which follows the pressure buildup and releases the pressure buildup,
  6. a reintroduction zone formed by continuous worm channels on said shaft following said detensioning zone, said reintroduction zone being formed with a cut away portion of the interior wall of said housing in the form of a segment of a circular cylinder having an axis thereof which is at an angle in relation to the worm shaft and lies in the direction of said degassing well, the edge of said segment facing the interior wall of the degassing well being rounded off with a radius tapering off in the direction of rotation of the shaft of zero and
  7. a second pressure buildup zone formed by discontinuous worm channels on said shaft and kneading dogs mounted within the housing.

2. A machine as claimed in claim 1 including channel occlusion elements which are rotatably moveable in and through the discontinuous worm channels to aid in compacting and reducing the volume of the mixture being kneaded.